(12) United States Patent
Tenny et al.

(10) Patent No.: US 10,306,483 B2
(45) Date of Patent: May 28, 2019

(54) MEASUREMENT GAP SCHEDULE SUPPORTING MULTIPLE BEAMS

(71) Applicant: Futurewei Technologies, Inc., Plano, TX (US)

(72) Inventors: Nathan Edward Tenny, Poway, CA (US); David Lecompte, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 64 days.

(21) Appl. No.: 15/464,037

(22) Filed: Mar. 20, 2017

(65) Prior Publication Data

US 2018/0192432 A1    Jul. 5, 2018

Related U.S. Application Data

(60) Provisional application No. 62/442,665, filed on Jan. 5, 2017.

(51) Int. Cl.
| | | |
|---|---|---|
| *H04W 4/00* | (2018.01) | |
| *H04W 16/28* | (2009.01) | |
| *H04W 72/12* | (2009.01) | |
| *H04L 5/00* | (2006.01) | |
| *H04W 24/10* | (2009.01) | |
| *H04W 88/08* | (2009.01) | |
| *H04W 72/04* | (2009.01) | |

(52) U.S. Cl.
CPC ....... *H04W 16/28* (2013.01); *H04W 72/1289* (2013.01); *H04L 5/0048* (2013.01); *H04L 5/0053* (2013.01); *H04W 24/10* (2013.01); *H04W 72/048* (2013.01); *H04W 88/08* (2013.01)

(58) Field of Classification Search
None
See application file for complete search history.

(56) References Cited

U.S. PATENT DOCUMENTS

2013/0142288 A1* 6/2013 Dinan ................. H04L 27/2649
375/340
2013/0322279 A1* 12/2013 Chincholi ............. H04W 24/10
370/252
(Continued)

FOREIGN PATENT DOCUMENTS

| CN | 103096368 A | 5/2013 |
| EP | 2687041 A1 | 1/2014 |

(Continued)

OTHER PUBLICATIONS

3GPP TS 38.331 V15.1.0 (Mar. 2018); 3rd Generation Partnership Project; Technical Specification Group Radio Access Network; NR; Radio Resource Control (RRC) protocol specification (Release 15), Mar. 2018, 268 pages.

(Continued)

*Primary Examiner* — Zewdu A Beyen
(74) *Attorney, Agent, or Firm* — Slater Matsil, LLP (57) ABSTRACT

An embodiment method for measurement gap scheduling includes generating, by a serving cell to which a UE is connected, a bitmap that indicates timing of measurement gaps for reference signals transmitted by the serving cell and at least one neighbor cell of the serving cell in beamformed and beam swept beams, and transmitting the bitmap to the UE in a configuration message.

18 Claims, 7 Drawing Sheets

(56) References Cited

U.S. PATENT DOCUMENTS

2014/0323144 A1  10/2014  Kim et al.
2017/0019233 A1   1/2017  Xu et al.

FOREIGN PATENT DOCUMENTS

| EP | 2938012 A4 | 7/2016 |
| EP | 3295599 A1 | 3/2018 |
| WO | 2015149229 A1 | 10/2015 |
| WO | 2017166549 A1 | 10/2017 |

OTHER PUBLICATIONS

LG Electronics, "Considerations on Measurement Mismatch Problem", 3GPP TSG RAN WG1 Meeting #63bis, R1-110545, Dublin, Ireland, Jan. 17-21, 2011, 5 pages.

\* cited by examiner

MEASUREMENT GAP SCHEDULE SUPPORTING MULTIPLE BEAMS

CROSS-REFERENCE TO RELATED APPLICATIONS

This application claims the benefit of U.S. Provisional Application No. 62/442,665, filed on Jan. 5, 2017, which application is hereby incorporated herein by reference.

TECHNICAL FIELD

The present disclosure relates generally to a system and method for wireless communications, and, in particular embodiments, to a system and method for measurement gap scheduling that supports multiple beams.

BACKGROUND

An access point, a base station, an evolved node B (eNB), a gNB, or a similar component may transmit reference signals for use by a user equipment (UE), a mobile station, or a similar component. The UE may analyze the reference signals to determine if the UE should be handed over from the access point currently serving the UE to the target access point that transmitted the reference signals. Alternatively, the UE may report its detection of the reference signals to the serving access point, which may then make a similar determination of whether the UE should be handed over to a target access point.

SUMMARY

In accordance with an embodiment of the present disclosure, a method for measurement gap scheduling comprises generating, by a serving cell to which a UE is connected, a bitmap that indicates timing of measurement gaps for reference signals transmitted by the serving cell and at least one neighbor cell of the serving cell in beamformed and beam swept beams, and transmitting the bitmap to the UE in a configuration message.

In accordance with another embodiment of the present disclosure, an access point in a serving cell comprises a processor and a transmitter. The processor is configured to generate a bitmap that indicates timing of measurement gaps for reference signals transmitted by the serving cell and at least one neighbor cell of the serving cell in beamformed and beam swept beams and is further configured to include the bitmap in a configuration message. The transmitter is configured to transmit the configuration message to a UE connected to the serving cell. The configuration message further includes a size of a reference signal measurement period, wherein the size is a least common multiple of a first length of a first reference signal pattern associated with the serving cell and a second length of a second reference signal pattern associated with the at least one neighbor cell; a threshold indicating a channel quality level of the serving cell below which the measurement gaps are to be applied; and a duration indicating a number of times the measurement period is to be repeated.

In accordance with another embodiment of the present disclosure, a method for measurement gap scheduling comprises receiving, by a UE from a serving cell to which the UE is connected, a measurement gap scheduling configuration in a configuration message that includes a bitmap indicating timing of measurement gaps for reference signals transmitted by the serving cell and at least one neighbor cell of the serving cell in beamformed and beam swept beams, transmitting a report indicating that a channel quality level of the serving cell is below a threshold at which the UE is to begin applying the measurement gap scheduling configuration, and activating the measurement gap scheduling configuration responsive to receiving an indication from the serving cell that the serving cell has received the report.

In accordance with another embodiment of the present disclosure, a UE comprises a non-transitory memory storage comprising instructions and one or more processors in communication with the memory. The one or more processors execute the instructions to receive, from a serving cell to which the UE is connected, a measurement gap scheduling configuration in a configuration message that includes a bitmap indicating timing of measurement gaps for reference signals transmitted by the serving cell and at least one neighbor cell of the serving cell in beamformed and beam swept beams, transmit a report indicating that a channel quality level of the serving cell is below a threshold at which the UE is to begin applying the measurement gap scheduling configuration, and activate the measurement gap scheduling configuration responsive to receiving an indication from the serving cell that the serving cell has received the report.

Optionally, in any of the preceding embodiments, the configuration message further includes a size of a reference signal measurement period, wherein the size is a least common multiple of a first length of a first reference signal pattern associated with the serving cell and a second length of a second reference signal pattern associated with the at least one neighbor cell.

Optionally, in any of the preceding embodiments, the configuration message further includes a threshold indicating a channel quality level of the serving cell below which the measurement gaps are to be applied.

Optionally, in any of the preceding embodiments, the serving cell stops data transmission to the UE during the measurement gaps responsive to receiving a report from the UE indicating that the channel quality level is below the threshold.

Optionally, in any of the preceding embodiments, the configuration message further includes a duration indicating a number of times the measurement period is to be repeated.

Optionally, in any of the preceding embodiments, the configuration message further includes a timing offset of the measurement period relative to a transmission timeline of the serving cell.

Optionally, in any of the preceding embodiments, the bitmap is generated by performing an "or" operation on a first reference signal pattern associated with the serving cell and at least a second reference signal pattern associated with one of the neighbor cells.

Optionally, in any of the preceding embodiments, the first reference signal pattern includes only reference signals transmitted in beamformed beams directed from the serving cell toward the UE within a first predefined range of directions.

Optionally, in any of the preceding embodiments, the second reference signal pattern includes only reference signals transmitted in beamformed beams directed from the neighbor cell toward the UE within a second predefined range of directions.

Any of the preceding embodiments may be used in any combination with any of the other preceding embodiments.

An advantage of one or more embodiments is that a method is provided for informing a UE of times when the UE is to listen for reference signals in an environment in

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The structure, manufacture and use of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosed components, and do not limit the scope of the disclosure.

It is sometimes preferable for the UE to not receive data when measuring reference signals. In some situations it is impossible for the UE to receive data when measuring the reference signals of certain access points, such as when a single-receiver UE measures reference signals transmitted on a different frequency from the serving frequency. Therefore, the UE is configured with measurement gaps during which measurements are made on reference signals from the target access point and data is not exchanged with the serving access point. The UE and the serving access point are both aware of the pattern in which the measurement gaps will occur, and thus the serving access point may refrain from transmitting data during the measurement gaps. Similarly, the UE knows to listen for reference signals from the target access point only within the measurement gaps and knows to exchange data with the serving access point only outside the measurement gaps.

The current design of measurement gaps may be directed toward use in the Long Term Evolution (LTE) channel structure, which has a dense availability of Cell-Specific Reference Signals (CRS). Gaps are continuous for 6 milliseconds (ms) and are repeated at intervals of either 40 ms or 80 ms over a 480 ms period. In LTE, 6 ms is typically a reasonable amount of time for a UE to detect a CRS transmission.

Details of reference signal (RS) scheduling in the proposed new radio (NR) environment are still to be determined, but RSs may be sparse in NR compared to LTE. A 6 ms measurement gap in NR may miss an RS occasion, and the RS may be absent for a relatively long time afterwards. In the worst case, a periodic measurement gap may resonate with the period of the RS, and a UE may always miss the needed signal. A typical way to guarantee that a signal is not missed is to make the measurement gap period and the RS period relatively prime. However, the time needed to guarantee that detection will occur may be long in such a case.

This RS measurement problem may be made worse by the beamforming and beam sweeping that may be implemented in NR systems. In beamforming, an access point may direct transmissions in one or more specific directions if the access point cannot achieve the needed range when transmitting omnidirectionally. However, an access point typically cannot beamform in all directions at once, so the access point may sweep multiple beamformed transmissions through multiple directions over time. Such directional transmissions add a spatial dimension to the problem of sparse RSs in NR. That is, when beamforming and beam sweeping are implemented, in addition to the UE needing to measure at a time when an RS is being transmitted, the UE may also need to measure at a time when a downlink beam is directed toward the UE.

A goal of performing measurements on RSs is to determine whether a neighboring object offers better service to a UE than the UE's current serving object. The criteria for defining "better" service may be variable and determined, for example, by a network implementation based on the relative strengths of signals from the serving and neighboring objects. In LTE and other existing technologies, the serving and neighboring objects may be cells, while in a beamformed system such as NR, the objects may be beams.

Figure 1:
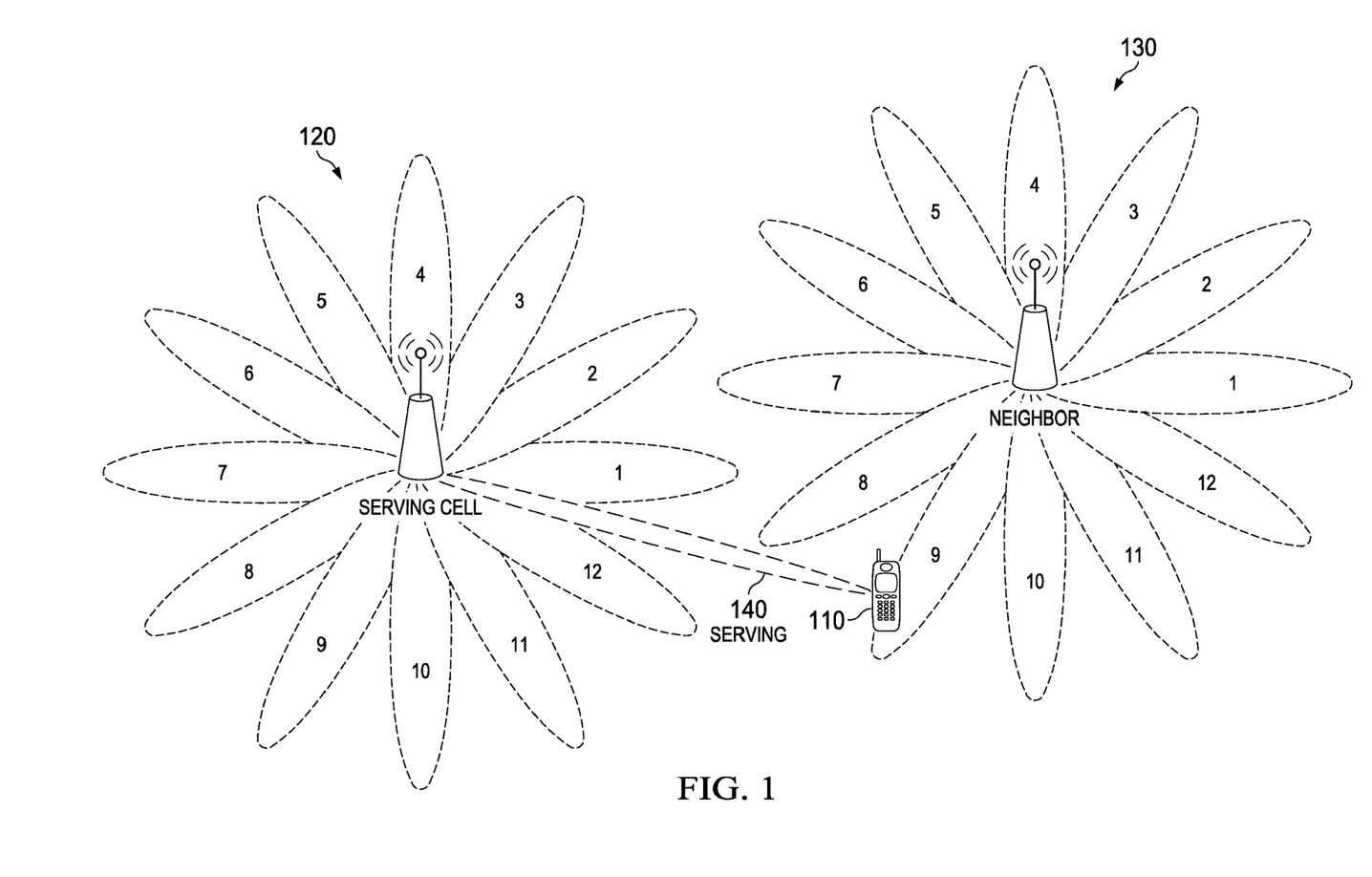
FIG. 1 is a diagram illustrating sweeping of multiple beamformed transmissions over time by a serving cell and a neighbor cell.

FIG. 1 illustrates a system in which measurements and comparisons of beams may occur. In this example, a serving cell 120 and a neighbor cell 130 each transmit beamformed beams 1-12 in a regularly-spaced pattern that covers a full revolution of 2π. In other cases, the number of beams and the width of the beams may be larger or smaller. At a first time, a cell transmits a first beam in a first direction. At a second time, the cell transmits a second beam in a second direction with a defined offset from the first direction. Such transmissions continue such that the cell sends beams throughout its coverage area. Thus, the cell effectively transmits omnidirectionally over time, but at any one instant, the cell transmits in only a subset of the 12 directions shown. In general, the cell transmits a plurality of beamformed beams in a sweeping pattern such that at least one beam is transmitted in every portion of the coverage area of the cell during the sweeping pattern. The beams 1-12 may be considered common or idle-mode beams that are available to any UE in the service area of the transmitting cell and may be referred to herein as fat beams.

When the serving cell 120 is in a connected mode with a UE 110, the serving cell 120 may communicate with the UE 110 by aggressively beamforming a beam at high gain to produce a narrow serving beam 140 that delivers high power in the direction of the UE 110. The serving cell 120 may be capable of transmitting the dedicated, narrow, high-gain serving beam 140 to the UE 110 at substantially the same time as transmitting one or more fat beams.

In LTE, when a UE determines that a measurement of a neighbor cell may be needed, the UE may compare the signal quality of the neighbor cell to the signal quality of its serving cell. The serving cell signal quality is already known to the UE, so the UE needs to make RS measurements only on the neighbor cell in order to make such a comparison. The result of such a comparison may determine whether the UE reports its measurements to the network in order to facilitate a handover decision by the network. As used herein, the term "network" may refer to any component or combination of components that configures a UE and/or controls a UE's access to a wireless telecommunication system.

By contrast, when the UE 110 in the beamformed system of FIG. 1 determines that a measurement of the neighbor cell 130 may be needed, it may not be clear which beam or beams from the serving cell 120 should be compared to the fat beams of the neighbor cell 130. Comparing the known characteristics of the narrow serving beam 140 to the fat beams from the neighbor cell 130 may not yield useful results, since the serving beam 140 and the fat beams from the neighbor cell 130 have different gains and other characteristics. Since the UE 110 is not connected to the neighbor cell 130, there is no narrow beam from the neighbor cell 130 to which the serving beam 140 from the serving cell 120 can be compared. Thus, if a determination is to be made regarding whether the neighbor cell 130 may provide better service than the serving cell 120, the most useful comparison to be made is between the fat beams from the serving cell 120 and the fat beams from the neighbor cell 130. The serving cell 120 may know the characteristics, as observed by the UE 110, of the serving beam 140 over which the serving cell 120 is actively communicating with the UE 110, based on UE feedback mechanisms such as channel state information (CSI) reports. However, the serving cell 120 may not know the characteristics, as observed by the UE 110, of the serving cell's fat beams, so the serving cell 120 may need to receive from the UE 110 signal quality measurements of the serving cell's own fat beams. Such measurements on the cell to which the UE 110 is connected are a departure from LTE procedures.

It may be noted that the serving beam 140 may interfere with one or more fat beams, including those of the serving cell 120. Such interference should not be considered in the measurements of the fat beams, since an environment with interference from the serving beam 140 would not accurately represent the radio environment that the UE 110 would experience if served by the neighbor cell 130. Thus, for the UE 110 to make any measurement of the fat beams, the serving beam 140 may need to be temporarily inactive. That is, the UE 110 may need measurement gaps not only for measurements of the neighbor cell 130, which may transmit at a different frequency than the serving cell 120, but may also need measurement gaps for measurements of the fat beams from the serving cell 120 itself.

For at least the reasons discussed above, the existing measurement system cannot easily accommodate beam sweeping, especially with multiple beams and sparse reference signals. Techniques to address such issues may include repeating a continuous measurement gap several times or extending a continuous measurement gap to an unreasonable length to capture the RS occasions on multiple beams. Such extensions or excessive repetitions of the measurement gaps may be undesirable.

In summary, several issues may arise if existing measurement systems are implemented in NR. For example, in measuring the quality of the serving cell's fat beams, the UE ignores the serving beam and thus does not compare the neighbor cell's fat beams to the service the UE is actually receiving from the serving cell. Also, the cells may have different beamforming capabilities. For instance, more gain may be available from one cell than another. In addition, the timing of the serving and neighbor cells is not necessarily the same, but it may be preferable for the serving and neighbor cells to know one another's timing to facilitate the scheduling of beams. Furthermore, all the information needed to measure the sparse reference signals in NR may not be available with existing measurement configurations. For instance, the beam sweeping patterns, which a UE may use to determine when to make a measurement, may not be known. The RS usage patterns, which a UE may use to avoid taking measurements when no RS is present, may likewise be unknown. A measurement subsystem implemented in NR may need to take such issues into account.

Due to the existence of such issues, it may be desirable to construct a measurement gap pattern based on the RS patterns of both the serving cell and the neighbor cell to allow measurements on the serving cell's RS occasions and on the neighbor cell's RS occasions. The UE may need to know when a measurement is being called for so that the UE provides accurate information to its measurement filters. That is, times when there was no RS to be measured should not be included in a measurement average. The relative timing between serving cells and neighbor cells may also need to be taken into account.

In addition, it may be preferable that the UE measure only the best beam or beams of the serving cell and/or the best beam or beams of the neighbor cell. Reasonable candidates for these best beams can be determined a priori by various heuristics, and thus it may not be necessary for the UE to measure all beams of the serving and/or neighbor cells. For example, in FIG. 1, beams 1 and 12 of the serving cell 120 may be compared to beam 9 of the neighbor cell 130. That is, the network may know to have the UE 110 measure beams 1 and 12 of the serving cell 120, based on the angle of the serving beam 140 and based on a reasonable inference that beams 1 and 12 of the serving cell 120 will be the best beams from the UE's perspective. If the network has approximate knowledge of the position of the UE 110 in the neighbor cell 130, the network may configure the UE 110 to measure, for example, beam 9 of the neighbor cell 130, since that beam is directed approximately in the direction of the UE 110.

In an embodiment, the network configures a UE with a measurement gap pattern that takes such considerations into account. The configuration may comprise a bitmap or other suitable data structure representing the union of the RS pattern of the serving cell and the RS pattern of neighbor cell, a periodicity of the RS pattern represented by the bitmap, a duration over which to apply the RS pattern represented by the bitmap, and an optional timing offset between the serving cell and the neighbor cell.

In an embodiment, implementation of such a pattern of measurement gaps may be triggered conditionally based on the channel quality indicator (CQI) of the serving beam. That is, the UE may report the serving beam's CQI to the network, and CQI below a configured threshold may be considered an indication that the configured measurement gap pattern will be activated. Such triggering based on CQI reports determined by measurements of one beam, the serving beam, while making serving cell RS measurements on a different type of beam, a fat beam, is unique to the embodiments disclosed herein. Furthermore, the CQI measurements and the serving and neighbor cell measurements may be based on different types of reference signals: for instance, UE-specific channel state information reference signals (CSI-RS) for the CQI measurements of the serving cell, and cell- or beam-specific extended sync signals (xSS) for the measurements of the serving and neighbor cells. Such triggering based on a measurement of one type of reference signal, e.g., CSI-RS, while evaluating and reporting a different type of reference signal, e.g., xSS, is unique to the embodiments disclosed herein.

Figure 2:
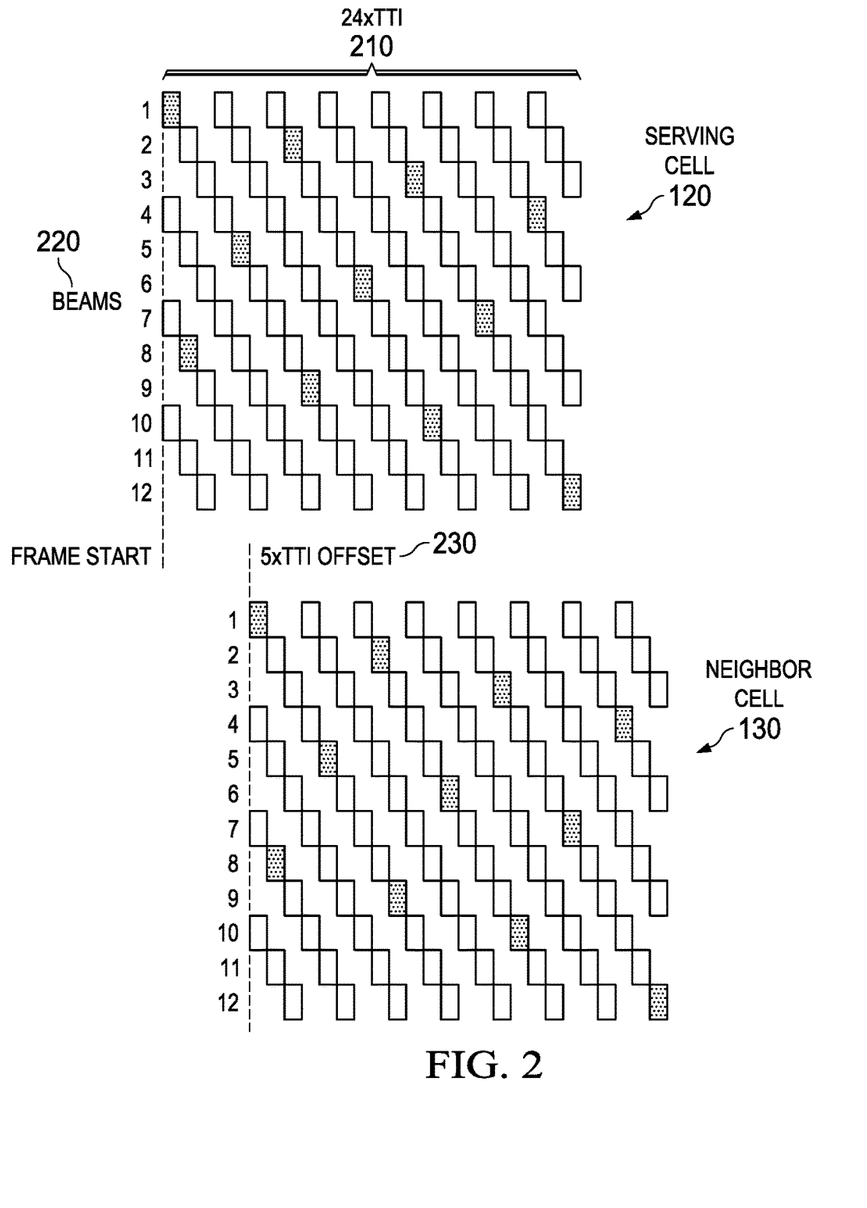
FIG. 2 is a diagram illustrating embodiment reference signal patterns in multiple beamformed transmissions by a serving cell and a neighbor cell.

Returning to FIG. 1, the serving cell 120 and the neighbor cell 130 may have the same beam pattern with a cycle time of, for example, three times the Transmission Time Interval (3xTTI). FIG. 2 illustrates an example of RS patterns and relative timing in a scenario such as that of FIG. 1. In this example, an RS pattern with a length of 24 subframes 210 across the 12 beams 220 is assumed, and the cells 120 and 130 have a frame timing offset 230 relative to one another of 5xTTI. These numbers are arbitrary and are used for the sake of example. In other examples, other values for these parameters could be used. In particular, the timing offset 230 may be the result of the serving cell 120 and the neighbor cell 130 transmitting on different timelines and may not be present if the serving cell 120 and the neighbor cell 130 are synchronized.

The shaded boxes in FIG. 2 indicate that an RS is present on the associated beam at the associated TTI. The white boxes indicate that a beam is active at the associated TTI, but that an RS is not present. Absence of a box indicates that a beam is inactive at the associated TTI.

Figure 3:
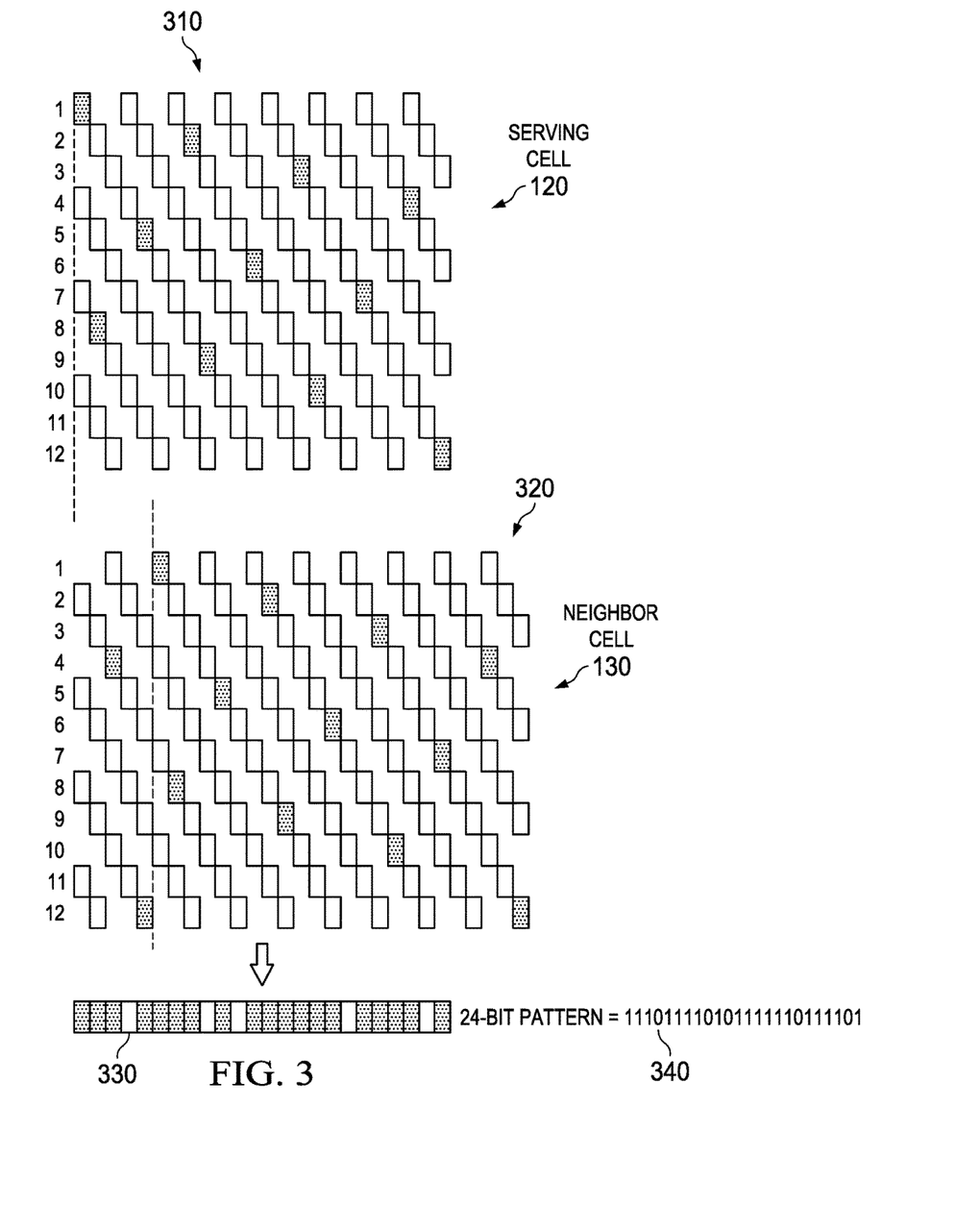
FIG. 3 is a diagram illustrating another set of embodiment reference signal patterns in multiple beamformed transmissions by a serving cell and a neighbor cell.

FIG. 3 illustrates a pattern of TTIs, beams, and reference signals similar to the pattern of FIG. 2. In an embodiment, an "or" operation may be performed on the RS pattern 310 of the serving cell 120 and the RS pattern 320 of the neighbor cell 130 to produce a measurement gap pattern 330 with a length of 24 indicating TTIs in which an RS occurs in the serving cell 120 or the neighbor cell 130 or both. That is, the pattern 330 represents all TTIs where some RS in at least one of the cells is active. Such an "or" or union operation is not performed in LTE since a UE in LTE uses measurement gaps only for its neighbor cell or cells and not for its serving cell, and because the relatively high RS density in LTE means that the timing of an RS transmission within the measurement gap can be determined reliably by the UE itself.

FIG. 3 further includes a bitmap 340 corresponding to the RS pattern 330. The bitmap 340 indicates with a '1' a TTI where an RS transmission occurs from the serving cell 120 or the neighbor cell 130 or both and indicates with a '0' a TTI where an RS transmission does not occur from either the serving cell 120 or the neighbor cell 130. In this example, an RS transmission occurs in 19 of the 24 TTIs. That is, the measurement duty cycle is 19/24, or approximately 79%.

In the example of FIG. 1, the UE 110 may attempt to measure an RS at a time when a beam is not directed toward the UE 110. Such unnecessary measurements may be avoided by making use of the fact that the serving cell 120 knows the approximate location of the UE 110. That is, the serving cell 120 knows the direction of the UE 110 based on the direction of the serving beam 140 and thus may be able to select which fat beams the UE 110 is to measure. In the example of FIG. 1, beams 1 and 12 from the serving cell 120 are directed in the approximate direction of the UE 110. Thus, it may be possible to limit the UE 110 to measuring beams 1 and 12 of the serving cell 120. In other words, the serving cell 120 includes in its RS pattern only the RSs transmitted in beams directed from the serving cell 120 toward the UE 110 within a predefined range of directions. In the example of FIG. 1, beams 1 and 12 from the serving cell 120 may fall within such a range.

Figure 4:
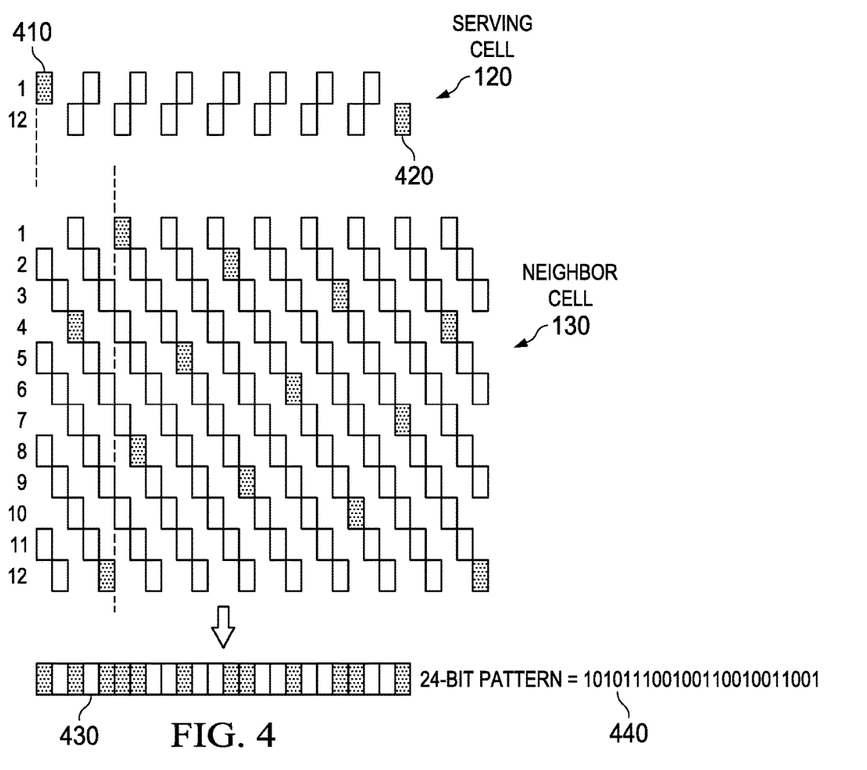
FIG. 4 is a diagram illustrating another set of embodiment reference signal patterns in multiple beamformed transmissions by a serving cell and a neighbor cell.

FIG. 4 illustrates such a scenario. In this case, an "or" operation is performed on a single RS 410 on beam 1 of the serving cell 120, a single RS 420 on beam 12 of the serving cell 120, and the RSs on all of the beams of the neighbor cell 130. The "or" operation results in RS pattern 430. It can be seen that measuring only beams 1 and 12 of the serving cell 120 reduces the duty cycle to 12/24, or 50%. Such a measurement pattern may be preferable to that of FIG. 3 since fewer unnecessary measurements occur. However, the bit pattern 440 of FIG. 4 may still include bits instructing the UE to measure RSs on beams from the neighbor cell 130 that are not directed toward the UE.

To further reduce the number of such unnecessary measurements, it may be possible to reduce the number of beams that are measured on the neighbor cell 130 as well. Such a reduction may be achieved if the serving cell 120 is aware of the approximate position of the UE in the neighbor cell 130. In such a case, the serving cell 120 may know that there is no need for the UE to measure beams that are not directed toward the UE from the neighbor cell 130. For example, in FIG. 1, the serving cell 120 may know that beams 1-5 in the neighbor cell 130 are not directed toward the UE 110. When the serving cell 120 generates an RS pattern for the neighbor cell 130, the serving cell 120 may exclude beams 1-5 in the neighbor cell 130 from the RS pattern. In other words, the serving cell 120 may include in the RS pattern for the neighbor cell 130 only the RSs transmitted in beams directed from the neighbor cell 130 toward the UE 110 within a predefined range of directions. In the example of FIG. 1, if beams 1-5 from the neighbor cell 130 are considered to not be directed toward the UE 110, then beams 6 through 12 may be considered to fall within such a range.

In an embodiment, a measurement gap pattern as disclosed herein may be described by parameters that may be referred to as period, bitmap, duration, and offset. The period parameter may be defined as the least common multiple of the lengths of the RS patterns in the involved cells. For example, in FIG. 3, the RS patterns 310 and 320 of both the serving cell 120 and the neighbor cell 130 have a length of 24, so the period parameter has a value of 24. As another example, if the RS pattern of the serving cell 120 had a length of 12, and the RS pattern of the neighbor cell 130 had a length of 15, the period parameter would have a value of 60, since 60 is the least common multiple of 12 and 15.

The bitmap parameter may be defined as a bitmap with a length equal to the period, where the bitmap indicates which TTIs include a measurement gap. That is, the bitmap parameter is a string of "0"s and "1"s indicating TTIs in which RSs are or are not transmitted by a UE's serving cell or at least one neighbor cell of the serving cell. In some cases, the length of the bitmap may be reduced by run-length encoding or similar techniques. For example, encoding of the bitmap may stop when no more "1"s remain to be encoded.

The duration parameter may be defined as the number of consecutive times to apply the measurement gap pattern described by the bitmap. The duration parameter multiplied by the period parameter yields the length of an interval in which a UE may monitor RSs.

The offset parameter may be defined as the time offset of the measurement gap pattern relative to the serving cell. This parameter is optional and may not be needed if the pattern is aligned with the serving cell's frame boundary.

In an embodiment, the measurement gap pattern may be configured as part of the Radio Resource Control (RRC) configuration of the UE. Activation of the gap pattern may be based on a threshold, which may be referred to as Thresh_CSI, applied to the CQI of the serving beam as evaluated by the UE. If the quality of the serving beam is above Thresh_CSI, there may be no requirement to make RS measurements, and the disclosed measurement gap patterns may not be applied. If the UE reports CQI on the serving beam below Thresh_CSI, the UE activates the gap pattern previously configured by and received from the serving cell. That is, the UE begins to measure serving and neighbor fat beams in measurement gaps as indicated by the gap pattern.

In an embodiment, the UE activates the gap pattern responsive to receiving an indication from the serving cell to do so. That is, the UE may send the serving cell a report indicating that the configured gap pattern is to be activated, but the UE may refrain from activating the gap pattern until receiving an acknowledgement from the serving cell that the serving cell is aware that the gap pattern is to be activated.

Figure 5:
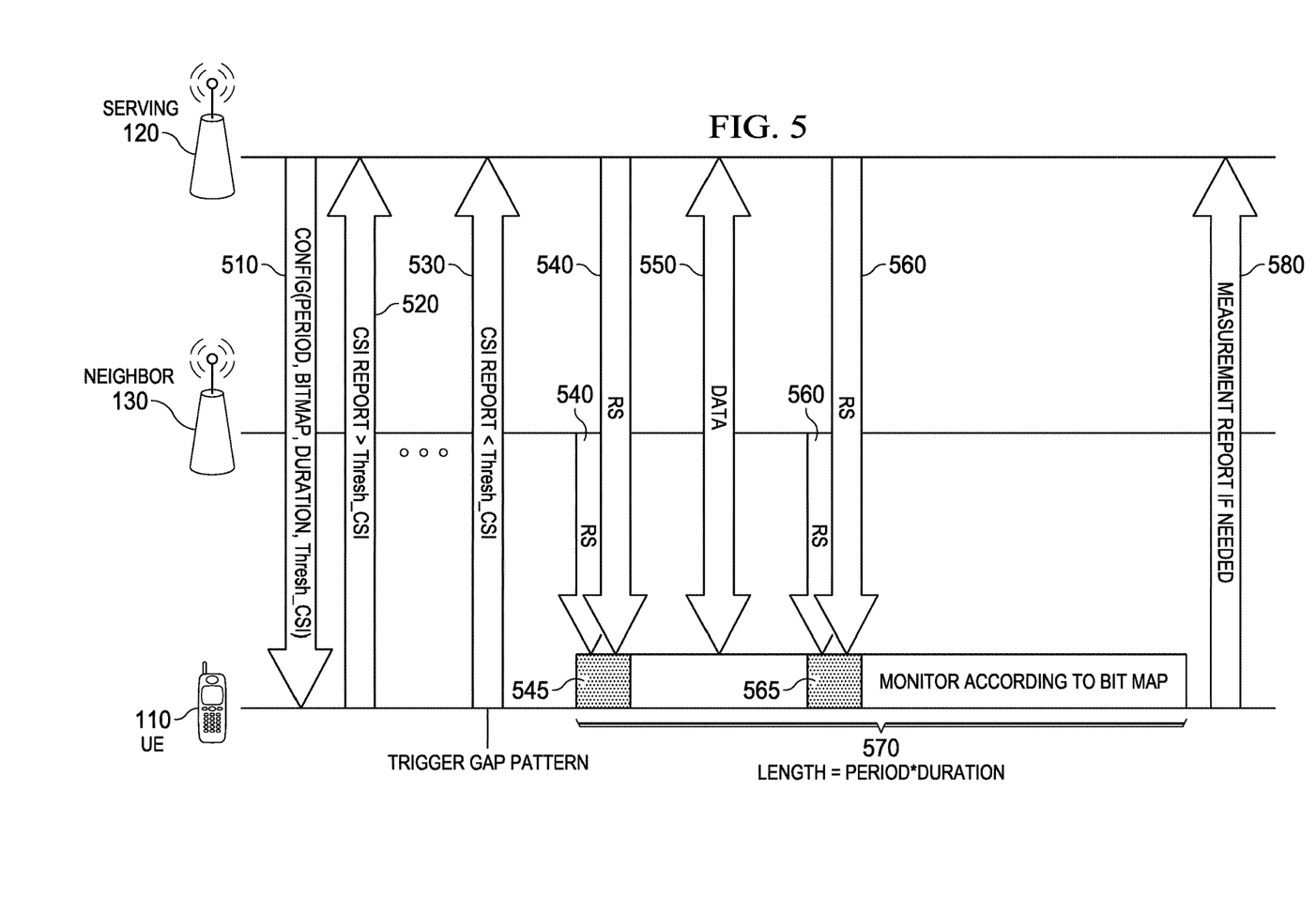
FIG. 5 illustrates an embodiment configuration and application of a measurement gap pattern.

FIG. 5 illustrates the configuration and application of a measurement gap pattern as disclosed herein. At event 510, the serving cell 120 sends configuration information for the gap pattern to the UE 110 in a configuration message. The configuration information may include the bitmap and one or more of the period, the duration, the optional offset, and the CSI threshold (Thresh_CSI), as described above. The serving cell 120 may have previously derived the configuration information based on its knowledge of the RSs transmitted by the serving cell 120 and the neighbor cell 130. At event 520, the UE 110 sends the serving cell 120 a report indicating that the measured CQI on the serving beam is greater than the CSI threshold. That is, the UE 110 indicates to the serving cell 120 that the UE 110 has no need to measure RSs from the serving cell 120 or the neighbor cell 130. The UE may periodically measure the CSI-RS on the serving beam and may continue to send such reports as long as the CQI is greater than the CSI threshold. At event 530, the UE 110 sends the serving cell 120 a report indicating that the CQI on the serving beam is less than the CSI threshold. That is, the UE 110 indicates to the serving cell 120 that RS measurements that follow the pattern of the bitmap transmitted at event 510 are to be triggered. At event 540, the serving cell 120 and the neighbor cell 130 send RSs that are received by the UE 110 in a measurement gap 545 specified by the bitmap. At event 550, the measurement gap 545 has ended, and the UE 110 and the serving cell 120 may exchange data. At event 560, another measurement gap 565 occurs, and the serving cell 120 and the neighbor cell 130 again send RSs to the UE 110. Throughout a time interval 570 with a length equal to the period parameter multiplied by the duration parameter, the UE 110 may continue to monitor RSs in measurement gaps that occur in accordance with the received bitmap. If the measurements made in the measurement gaps that occur in the time interval 570 indicate that the UE 110 needs to report measurements to the serving cell 120, the UE 110 may prepare a measurement report indicating the measurement results. After the time interval 570 ends, the UE 110 sends the measurement report to the serving cell 120 at event 580.

Figure 6:
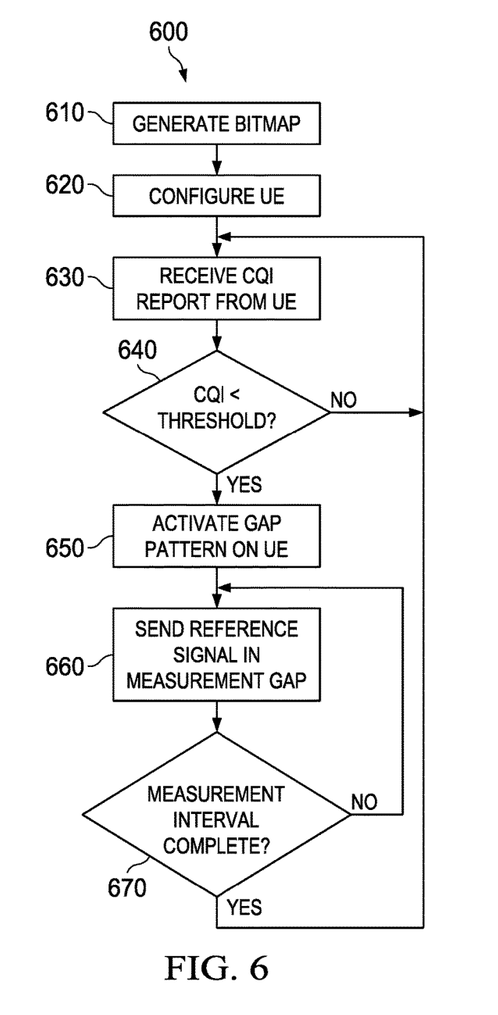
FIG. 6 is a flowchart of an embodiment method for measurement gap scheduling.

FIG. 6 is a flowchart of an embodiment method 600 for measurement gap scheduling from the perspective of a serving cell. At block 610, the serving cell generates a bitmap as described above that indicates TTIs in which the fat beams of the serving cell and/or a neighbor cell will transmit reference signals. At block 620, the serving cell configures a UE by transmitting to the UE a configuration message that includes the bitmap, a period, a duration, a CSI threshold, and optionally an offset, as described above. At block 630, the serving cell receives a report from the UE indicating the CQI for the serving cell's serving beam. At block 640, the serving cell determines whether the report indicates that the CQI is below a threshold. If not, the flow returns to block 630, and the serving cell continues to receive CQI reports from the UE. If the CQI is below the threshold, the serving cell, at block 650, activates the gap pattern defined by the bitmap. That is, the serving cell informs the UE to listen for reference signals according to the gap pattern. At block 660, the serving cell sends a reference signal in a measurement gap designated in the bitmap. At block 670, the serving cell determines whether the measurement interval, defined as the size of a measurement period multiplied by the duration of the measurement periods, is complete. If so, the flow returns to block 630, and the serving cell resumes receiving CQI reports from the UE. If the measurement interval is not complete, the flow returns to block 660, and the serving cell continues to send reference signals in measurement gaps designated in the bitmap. The serving cell may continue to send reference signals on other occasions outside the measurement gaps, for example, for the benefit of other UEs; these additional reference signals are not shown. The serving cell's processing of information received from the UE responsive to the UE's reception of the reference signals may occur in an existing manner.

Figure 7:
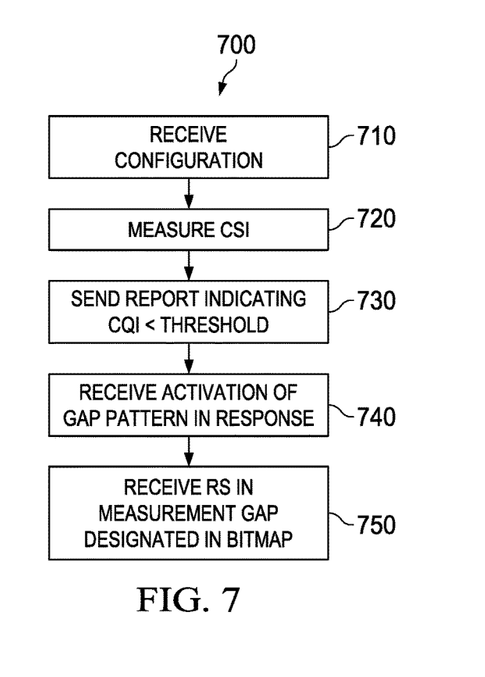
FIG. 7 is a flowchart of another embodiment method for measurement gap scheduling.

FIG. 7 is a flowchart of an embodiment method 700 for measurement gap scheduling from the perspective of a UE. At block 710, the UE receives a configuration that includes a bitmap, a period, a duration, a CSI threshold, and optionally an offset, as described above. At block 720, the UE performs a CSI measurement on the serving beam from the UE's serving cell. At block 730, the UE sends a report to the serving cell indicating that the CQI is below the CSI threshold. At block 740, responsive to sending the report indicating that the CQI is below the CSI threshold, the UE receives a message from the serving cell indicating that the UE is to activate the gap pattern defined by the bitmap. At block 750, the UE receives a reference signal from the serving cell or a neighbor cell in a measurement gap designated in the bitmap. The UE may process the reference signal in an existing manner.

Figure 8:
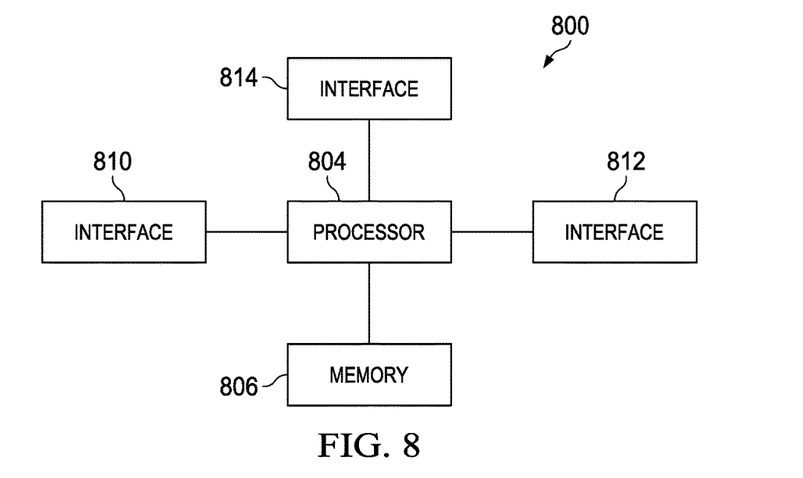
FIG. 8 illustrates a block diagram of an embodiment processing system for performing methods described herein.

FIG. 8 illustrates a block diagram of an embodiment processing system 800 for performing methods described herein, which may be installed in a host device. As shown, the processing system 800 includes a processor 804, a memory 806, and interfaces 810-814, which may (or may not) be arranged as shown in the figure. The processor 804 may be any component or collection of components adapted to perform computations and/or other processing related tasks, and the memory 806 may be any component or collection of components adapted to store programming and/or instructions for execution by the processor 804. In an embodiment, the memory 806 includes a non-transitory computer readable medium. The interfaces 810, 812, 814 may be any component or collection of components that allow the processing system 800 to communicate with other devices/components and/or a user. For example, one or more of the interfaces 810, 812, 814 may be adapted to communicate data, control, or management messages from the processor 804 to applications installed on the host device and/or a remote device. As another example, one or more of the interfaces 810, 812, 814 may be adapted to allow a user or user device (e.g., personal computer (PC), etc.) to interact/communicate with the processing system 800. The processing system 800 may include additional components not depicted in the figure, such as long term storage (e.g., non-volatile memory, etc.).

In some embodiments, the processing system 800 is included in a network device that is accessing, or part otherwise of, a telecommunications network. In one example, the processing system 800 is in a network-side device in a wireless or wireline telecommunications network, such as a base station, a relay station, a scheduler, a controller, a gateway, a router, an applications server, or any other device in the telecommunications network. In other embodiments, the processing system 800 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 9:
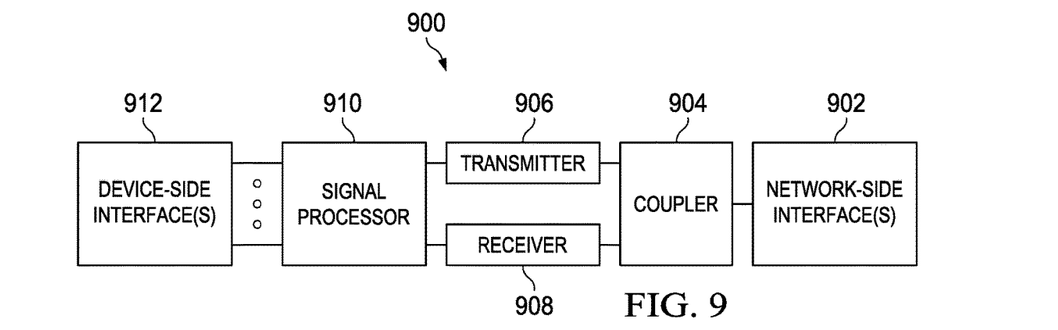
FIG. 9 illustrates a block diagram of a transceiver adapted to transmit and receive signaling over a telecommunications network.

In some embodiments, one or more of the interfaces 810, 812, 814 connects the processing system 800 to a transceiver adapted to transmit and receive signaling over the telecommunications network. FIG. 9 illustrates a block diagram of a transceiver 900 adapted to transmit and receive signaling over a telecommunications network. The transceiver 900 may be installed in a host device. As shown, the transceiver 900 comprises a network-side interface 902, a coupler 904, a transmitter 906, a receiver 908, a signal processor 910, and a device-side interface 912. The network-side interface 902 may include any component or collection of components adapted to transmit or receive signaling over a wireless or wireline telecommunications network. The coupler 904 may include any component or collection of components adapted to facilitate bi-directional communication over the network-side interface 902. The transmitter 906 may include any component or collection of components (e.g., up-converter, power amplifier, etc.) adapted to convert a baseband signal into a modulated carrier signal suitable for transmission over the network-side interface 902. The receiver 908 may include any component or collection of components (e.g., down-converter, low noise amplifier, etc.) adapted to convert a carrier signal received over the network-side interface 902 into a baseband signal. The signal processor 910 may include any component or collection of components adapted to convert a baseband signal into a data signal suitable for communication over the device-side interface(s) 912, or vice-versa. The device-side interface(s) 912 may include any component or collection of components adapted to communicate data-signals between the signal processor 910 and components within the host device (e.g., the processing system 800, local area network (LAN) ports, etc.).

The transceiver 900 may transmit and receive signaling over any type of communications medium. In some embodiments, the transceiver 900 transmits and receives signaling over a wireless medium. For example, the transceiver 900 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 902 comprises one or more antenna/radiating elements. For example, the network-side interface 902 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 900 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

The computer-readable non-transitory media includes all types of computer readable media, including magnetic storage media, optical storage media, and solid state storage media and specifically excludes signals. It should be understood that the software can be installed in and sold with a UE or other device. Alternatively the software can be obtained and loaded into the UE or other device, including obtaining the software via a disc medium or from any manner of network or distribution system, including, for example, from a server owned by the software creator or from a server not owned but used by the software creator. The software can be stored on a server for distribution over the Internet, for example.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a generating unit/module and/or an activating unit/module. The respective units/modules may be hardware, software, or a combination thereof. For instance, one or more of the units/modules may be an integrated circuit, such as field programmable gate arrays (FPGAs) or application-specific integrated circuits (ASICs).

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method for measurement gap scheduling, the method comprising:
   generating, by a serving cell to which a user equipment (UE) is connected, a bitmap indicating to the UE a timing of measurement gaps for reference signals, the reference signals comprising reference signals corresponding to a beamformed beam of the serving cell and a beamformed beam of at least one neighbor cell of the serving cell in a beamformed system; and
   transmitting the bitmap to the UE in a message, the message further comprising:
      a size of a reference signal measurement period, the size being a least common multiple of a first length of a first reference signal pattern associated with the serving cell and a second length of a second reference signal pattern associated with the at least one neighbor cell;
      a threshold indicating a channel quality level of the serving cell below which the measurement gaps are to be applied; and
      a duration indicating a number of times a measurement period is to be repeated.

2. The method of claim 1, wherein the serving cell stops data transmission to the UE during the measurement gaps responsive to receiving a report from the UE indicating that the channel quality level is below the threshold.

3. The method of claim 1, wherein the message further comprises a timing offset of a measurement period relative to a transmission timeline of the serving cell.

4. The method of claim 1, wherein the bitmap is generated by performing an "or" operation on a first reference signal pattern associated with the serving cell and at least a second reference signal pattern associated with the at least one neighbor cell.

5. The method of claim 4, wherein the reference signals further comprise reference signals corresponding to a plurality of beamformed beams of the serving cell and a plurality of beamformed beams of the at least one neighbor cell, wherein the first reference signal pattern comprises reference signals transmitted in the plurality of beamformed beams directed from the serving cell toward the UE within a first predefined range of directions.

6. The method of claim 5, wherein the reference signals further comprise reference signals corresponding to a plurality of beamformed beams of the serving cell and a plurality of beamformed beams of the at least one neighbor cell, wherein the second reference signal pattern comprises reference signals transmitted in the plurality of beamformed beams directed from the neighbor cell toward the UE within a second predefined range of directions.

7. An access point in a serving cell, the access point comprising:
   a processor configured to generate a bitmap that indicates, to a user equipment (UE) connected to the serving cell, a timing of measurement gaps for reference signals, the reference signals comprising reference signals corresponding to a beamformed beam of the serving cell and a beamformed beam of at least one neighbor cell of the serving cell in a beamformed system and further configured to comprise the bitmap in a message; and
   a transmitter configured to transmit the message to the UE, wherein the message further comprises:
      a size of a reference signal measurement period, wherein the size is a least common multiple of a first length of a first reference signal pattern associated with the serving cell and a second length of a second reference signal pattern associated with the at least one neighbor cell;
      a threshold indicating a channel quality level of the serving cell below which the measurement gaps are to be applied; and
      a duration indicating a number of times a measurement period is to be repeated.

8. The access point of claim 7, wherein the message further comprises a timing offset of the measurement period relative to a transmission timeline of the serving cell.

9. The access point of claim 7, wherein the serving cell stops data transmission to the UE during the measurement gaps responsive to receiving a report from the UE indicating that the channel quality level is below the threshold.

10. The access point of claim 7, wherein the processor is configured to generate the bitmap by performing an "or" operation on a first reference signal pattern associated with the serving cell and at least a second reference signal pattern associated with the at least one neighbor cell.

11. The access point of claim 10, wherein the reference signals further comprise reference signals corresponding to a plurality of beamformed beams of the serving cell and a plurality of beamformed beams of the at least one neighbor cell, wherein the first reference signal pattern comprises reference signals transmitted in the plurality of beamformed beams directed from the serving cell toward the UE within a first predefined range of directions.

12. The access point of claim 11, wherein the reference signals further comprise reference signals corresponding to a plurality of beamformed beams of the serving cell and a plurality of beamformed beams of the at least one neighbor cell, wherein the second reference signal pattern comprises reference signals transmitted in the plurality of beamformed beams directed from the neighbor cell toward the UE within a second predefined range of directions.

13. A method for measurement gap scheduling, the method comprising:
   receiving, by a user equipment (UE) from a serving cell to which the UE is connected, a measurement gap scheduling configuration in a message, the message comprising:
      a bitmap indicating timing of measurement gaps for reference signals transmitted by the serving cell and at least one neighbor cell of the serving cell in beamformed and beam swept beams;
      a size of a reference signal measurement period, the size being a least common multiple of a first length of a first reference signal pattern associated with the serving cell and a second length of a second reference signal pattern associated with the at least one neighbor cell;
      a threshold indicating a channel quality level of the serving cell below which the measurement gaps are to be applied; and
      a duration indicating a number of times a measurement period is to be repeated;
   transmitting a report indicating that a channel quality level of the serving cell is below a threshold at which the UE is to begin applying the measurement gap scheduling; and
   activating the measurement gap scheduling responsive to receiving an indication from the serving cell that the serving cell has received the report.

14. The method of claim 13, wherein the message further comprises a timing offset of a measurement period relative to a transmission timeline of the serving cell.

15. The method of claim 13, wherein the reference signals further comprise reference signals corresponding to a plurality of beamformed beams of the serving cell and a plurality of beamformed beams of the at least one neighbor cell, wherein the first reference signal pattern comprises reference signals transmitted in the plurality of beamformed beams directed from the serving cell toward the UE within a first predefined range of directions.

16. A user equipment (UE) comprising:
   a non-transitory memory storage comprising instructions; and
   one or more processors in communication with the non-transitory memory storage, wherein the one or more processors execute the instructions to:
      receive, from a serving cell to which the UE is connected, a measurement gap scheduling configuration in a message, the message comprising:
         a bitmap indicating to the UE a timing of measurement gaps for reference signals, the reference signals comprising reference signals corresponding to a beamformed beam of the serving cell and a beamformed beam of at least one neighbor cell of the serving cell in beamformed system;
         a size of a reference signal measurement period, the size being a least common multiple of a first length of a first reference signal pattern associated with the serving cell and a second length of a second reference signal pattern associated with the at least one neighbor cell;

a threshold indicating a channel quality level of the serving cell below which the measurement gaps are to be applied; and a duration indicating a number of times a measurement period is to be repeated;

transmit a report indicating that a channel quality level of a serving beam of the serving cell is below a threshold and, base thereon, applying the measurement gap scheduling; and activate the measurement gap scheduling responsive to receiving an indication from the serving cell that the serving cell has received the report.

17. The UE of claim 16, wherein the message further comprises a timing offset of a measurement period relative to a transmission timeline of the serving cell.

18. The UE of claim 16, wherein the reference signals further comprise reference signals corresponding to a plurality of beamformed beams of the serving cell and a plurality of beamformed beams of the at least one neighbor cell, wherein the first reference signal pattern comprises reference signals transmitted in the plurality of beamformed beams directed from the serving cell toward the UE within a first predefined range of directions.

* * * * *